April 24, 1934.  A. DO HUU CHAN  1,955,952
METHOD FOR POURING GLASS
Filed May 29, 1930
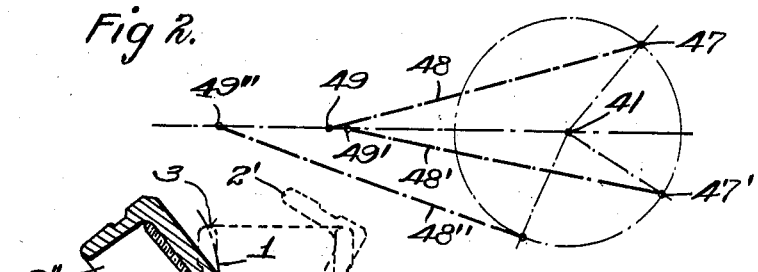
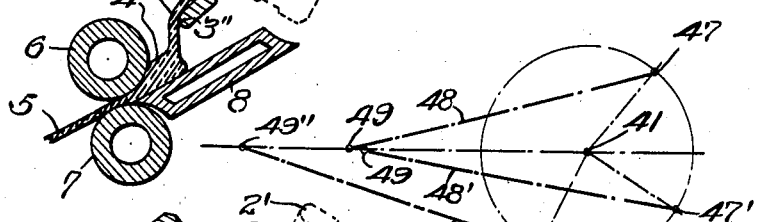
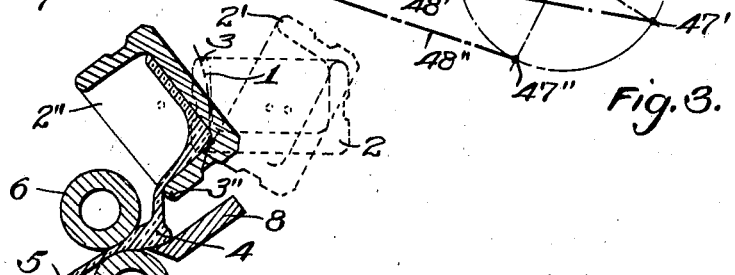
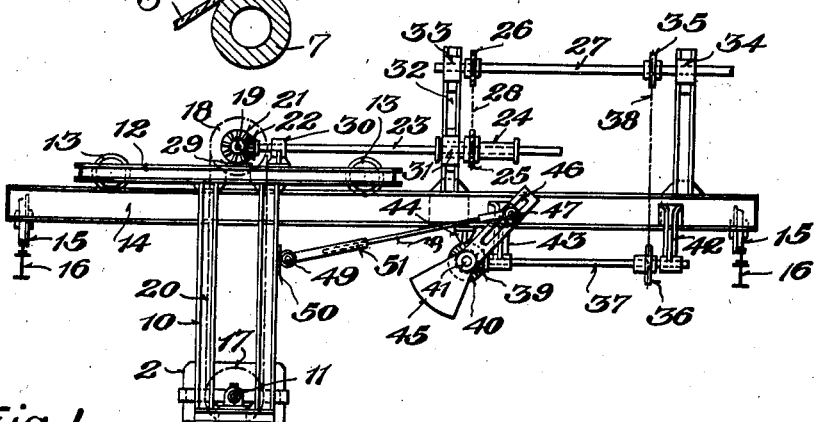
Inventor
André Do-Huu Chan,
By [signature]
Attorneys Patented Apr. 24, 1934

1,955,952

UNITED STATES PATENT OFFICE 1,955,952

METHOD FOR POURING GLASS

André Do Huu Chan, Cirey-sur-Vezouse, France, assignor to Société Anonyme des Manufactures des Glaces & Produits Chimiques de Saint Gobain, Chauny Cirey, Paris France Application May 29, 1930, Serial No. 457,137
In France June 11, 1929

3 Claims. (Cl. 49—39)

In a well known type of machine for issuing sheet glass between rolls, the contents of a glass pot or ladle are poured on a receiving bed more or less adjacent to the forming pass between the rolls, the dumping of the glass being effected by tilting the molten glass container about a horizontal axis parallel to the axes of the forming rolls and situated either in the longitudinal plane of symmetry of the crucible at a point near to its center of gravity when filled with glass, or near to the pouring lip of the container.

In the case wherein the axis about which the crucible is tilted is in the longitudinal plane of symmetry thereof, the pouring lip sweeps out a surface of revolution about the axis of tilting, in such a manner that the point at which the glass falls, at a time during which the outflow of glass is greatest, is nearest to the forming zone or pass, and recedes from this zone or pass when the outflow decreases.

Now, the movement of the glass towards the forming pass during the period when the supply is increasing, results in an undue crowding of the glass towards the pass. From this it results that, on the one hand, the mass of the glass in contact with the rollers is very thick, so that there is an appreciable deformation of these rollers (due to heating) giving rise to irregularities in the thickness of the formed sheet. On the other hand, part of the glass dammed up by the rollers rebounds in a backward direction whereby folds are formed in the mass of glass spread out in front of the forming pass and air bubbles are caught between the folds and remain in the rolled sheet of glass.

On the contrary when the point at which the glass falls moves away from the forming zone at a time when the outflow is decreasing, the glass, instead of piling up immediately against the forming rollers, distributes itself at a distance therefrom in a thin layer, the viscosity of which rapidly increases. As a result not only is the sheet of glass of less width at the trailing edge, which causes some loss in the subsequent trimming of the sheet, but also there is a loss of homogeneity of the glass at different parts of the sheet.

In the case wherein the axis of tilting is near to the pouring lip of the container, the stream of glass flows out therefrom at a distance from the forming zone which is very nearly constant and thus mitigates defects due to variation of the position of the point at which the glass falls, but does not remove them entirely since in order to get rid of them it is necessary to bring the point at which the glass falls closer to the forming zone as the rate of pouring is decreasing.

The subject of this invention is a method and apparatus by which the distance from the forming zone or pass of the point at which the glass falls, is varied in such a manner that this distance is increased, or at least does not decrease, whilst the rate of pouring is increasing and is rapidly decreased as the pouring decreases. The method consists in giving to the axis about which the container is tilted, a movement of translation perpendicular to itself which is mechanically co-ordinated with the rotation of the container about this axis in such a manner that the pouring lip sweeps out a curved surface in conformity with the desired displacement of the point at which the glass falls. This dual movement can be combined, by means of mechanical or electrical devices, with a second movement of translation perpendicular to the first, that is to say, parallel to the tilting axis, and apparatus herein claimed is one adapted to carry out the above method.

In the accompanying drawing, given by way of example only, Figures 1, 2 and 3 are illustrative of a method of pouring in accordance with this invention, in the case of a container tilting about an axis which is in the longitudinal plane of symmetry of the container, Figure 1 being an elevation of mechanism for carrying the said method into practice, and Figures 2 and 3 being diagrammatic views illustrating the movements effected by this apparatus.

In Figures 2 and 3, the path swept out by the center of the pouring lip is indicated by the broken curved line 1. 2, 2' and 2" indicate positions respectively occupied by the container at the commencement, middle and end of the pouring operation. 3, 3' and 3" indicate the positions of the pouring lip along the line 1, respectively corresponding to the successive positions 2, 2', 2" of the container. 4 indicates the mass of glass before passing the forming rollers and 5 indicates the formed sheet of glass. 6 indicates the upper forming roller and 7 the lower forming roller having a forming pass between them. The glass is poured out on to a table 8 extending close to the lower roller 7.

The mechanism constructed in accordance with this invention as shown in Figure 1, provides for a double movement of the container 2, consisting of a rotary movement around its axis of tilting and a movement of translation, parallel to the plane of the paper. The said mechanism comprises parts hereinafter described.

A frame 10, in which the container is carried and in which it turns, by the trunnions 11 of the container, is dependent from a carriage 12, mounted on wheels 13 travelling on the longitudinal members 14 of a travelling platform which itself is provided with wheels 15 travelling on rails 16.

Two sprocket wheels 17 and 18, respectively, keyed on one of the trunnions 11 and on a shaft 19 parallel thereto, are connected by a sprocket chain 20.

A pair of bevel wheels 21, 22, are respectively keyed on the shaft 19 and on a shaft 23, which is driven by a sleeve 24 through which the shaft 23 can slide.

Sprocket wheels 25 and 26 are respectively keyed on the sleeve 24 and on a driving shaft 27, and are connected by a sprocket chain 28.

Bearings 29 for the shaft 19 are carried by the carriage 12. One bearing 30 for the shaft 23 is fixed on the carriage 12 and another bearing 31 for this shaft is fixed on a frame 32 mounted on the longitudinal members 14 above mentioned, the said frame also carrying bearings 33 and 34 for the driving shaft 27.

A sprocket wheel 35 is keyed on the driving shaft 27, and another sprocket wheel 36 is adjustably fixed on a shaft 37 parallel thereto, and the said wheels are connected by a sprocket chain 38.

A pair of bevel wheels 39, 40 are keyed respectively on the shaft 37 and on a shaft 41 at right angles thereto.

The bearings 42 and 43 for the shaft 37 and bearings 44 carrying the shaft 41 are fixed to the longitudinal members 14.

A crank 45, keyed on the shaft 41, is provided with a slideway 46 in which a wrist pin 47 for a connecting rod 48 can be held in any required position of adjustment.

A pivot pin 49 mounted in the brackets 50 on the frame 10 carries a sleeve 51 to which the connecting rod 48 can be secured in any required position of adjustment to vary the effective length of the rod.

Rotary movement of the driving shaft 27 effects not only a rotary movement of the shafts 23, 19 and consequent rotary movement of the trunnions 11 for tilting the container 2 but also effects rotary movement of the shafts 37, 41 and the crank 45 which communicates a movement of translation to the frame 10 through the connecting rod 48.

From this it results that the container receives two movements simultaneously, one a tilting movement transmitted thereto by means of the mechanism 17, 20, 18, 19, 23, 28 and 27, the other a movement of translation due to movement of the carriage 12 effected by the rod 48. This movement of translation first of all retracts the container and its pouring lip from the forming rollers by reason of the position in which the crank is initially set, and the direction of its rotary movement, and thereafter advances or moves the container towards the forming rollers.

Figures 2 and 3 show the results obtained by the combination of the tilting movement with a movement of translation and also show the contour of the path swept out by the pouring lip.

The construction shown in Figure 1 can be applied to the case of a container tilted about an axis which is not in the longitudinal plane of symmetry thereof, for example, when this axis is near to the pouring lip or coincides with it.

The invention is also applicable to cases wherein the feeding of the glass is effected by means of pouring ladles, although shown as embodying the pouring of glass from a melting pot.

The mechanism herein described is only given by way of example, the parts comprised in such mechanism and the methods of combining the said parts can be varied, provided that the method which is the subject of this invention can thereby be carried into practice.

Having thus described my invention what I claim is:—

1. The hereinbefore described method of delivering glass from a container to a point adjacent to a forming pass from which point the glass will be delivered by gravity to the pass which comprises tilting said container to deliver glass therefrom and during delivery period of the glass retracting the pouring lip of the container from a vertical plane passing through the forming pass lengthwise thereof, and then as the rate of pouring decreases, advancing the pouring lip towards such plane.

2. The hereinbefore described method of varying the position at which the glass falls from a container with respect to the position of the forming pass to which glass is to be supplied by gravity-flow down an inclined receiver from the position in which it is delivered comprising increasing the horizontal distance between these positions during the period at which the outflow is increasing, and decreasing said distance when the outflow decreases, by giving to the axis about which the container is tilted a movement of translation at right angles to the direction of this axis, mechanically combined with the rotary movement of the container about the said axis so that the pouring lip is moved along a curved path conforming to the required change in the position of the point at which the glass falls.

3. The hereinbefore described method of delivering glass from a container to a forming pass which comprises tilting said container to deliver glass therefrom to a receiver and at the end of the delivery period of the glass advancing the pouring lip of the container with an accelerating speed in respect to the tilting towards a vertical plane passing through the forming pass lengthwise thereof, and feeding the glass as delivered to the receiver therefrom to the forming pass.

ANDRÉ DO HUU CHAN.